J. A. GANSTER.
METHOD OF FORMING RINGS FROM SOLID BARS.
APPLICATION FILED JUNE 21, 1917.

1,328,509.

Patented Jan. 20, 1920.
2 SHEETS—SHEET 1.

Inventor
J. A. Ganster
By his Attorneys
Rogers, Kennedy & Campbell

UNITED STATES PATENT OFFICE.

JOSEPH A. GANSTER, OF PHILADELPHIA, PENNSYLVANIA.

METHOD OF FORMING RINGS FROM SOLID BARS.

1,328,509.

Specification of Letters Patent.   Patented Jan. 20, 1920.

Application filed June 21, 1917.   Serial No. 176,001.

*To all whom it may concern:*

Be it known that I, JOSEPH A. GANSTER, a citizen of the United States, residing at Philadelphia, in the county of Philadelphia and State of Pennsylvania, have invented certain new and useful Improvements in Methods of Forming Rings from Solid Bars, of which the following is a specification, reference being had therein to the accompanying drawing.

This invention relates to the production of rings or like annular bodies from solid bars, and the invention consists of an improved method of procedure, and an improved apparatus for carrying the method into effect.

In accordance with my invention as regards the method of procedure, a cylindrical bar is heated and rotated about its longitudinal axis, and while rotating, the material of the bar is displaced laterally at its center by forcing a forming mandrel into the end of the bar; whereby a central cavity or recess will be formed in the end of the bar. The forming mandrel is then withdrawn and the wall of the recess is subjected to an operation by which the wall is properly sized and the faces thereof are brought into parallelism, and finally the extremity of the recessed portion of the bar is severed from the body portion, thereby forming a ring. These operations are repeated to form successive rings, the bar before each severing operation being subjected to a recessing operation and a sizing operation.

The apparatus for carrying my improved method into effect embodies as its essential features a rotary holder or chuck for holding the bar and rotating the same about its longitudinal axis, a forming mandrel, a suitable support for the mandrel operable to advance the mandrel axially into the center of the bar and to retract the same, in order to displace the material of the bar and form a recess therein, pressure devices for subjecting the wall of the recess to radial pressure, a suitable support for said devices operable to advance the same so that they will engage the inner and outer faces of the wall of the recess and subject the wall to radial pressure to properly size and shape the same, and a severing cutter operable to sever a transverse section from the extremity of the recessed end of the bar to form the ring.

In the accompanying drawings:

Fig. 6 is a top plan view of a form of apparatus suitable for carrying my improved method into effect, the said figure showing the pressure devices acting on the wall of the recess and subjecting the same to pressure to bring it to the proper form and size.

Fig. 7 is a transverse sectional elevation of the same on the line *a—a* of Fig. 6 as viewed in the direction of the arrows on said line.

Figure 1:
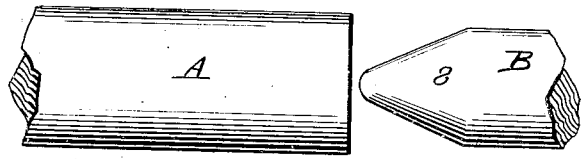
Figure 1 is a side elevation of the end of the blank or bar from which the rings are formed, and the forming mandrel, showing the relation of the said parts just before the mandrel is forced into the end of the bar.
Figure 2:
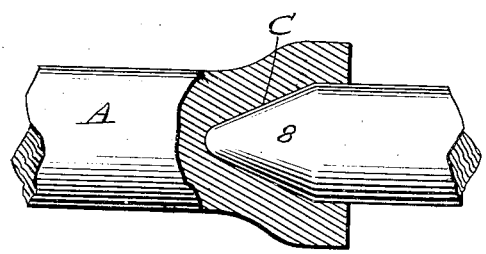
Fig. 2 is a similar view showing the mandrel entered into the end of the bar and the material of the latter displaced laterally and forming a central recess.
Figure 3:
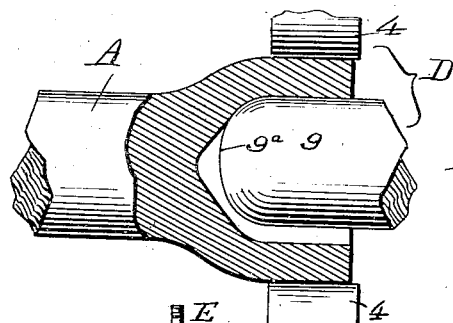
Fig. 3 is a similar view showing the forming mandrel removed from the recess and the wall of the latter acted on by the pressure devices to subject said wall to radial pressure and properly size the same.
Figure 4:
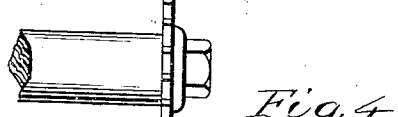
Fig. 4 is a view showing the action of the cutter in severing the recessed extremity of the bar.
Figure 4:
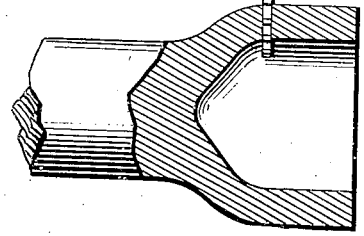
Figure 5:
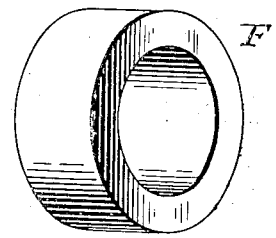
Fig. 5 is a perspective view of the severed section or complete ring.

Referring to the drawings:

In carrying my improved method into effect the successive stages of which are shown in Figs. 1 to 4 inclusive, a blank A is provided in the form of a bar circular in cross section which is heated to the proper temperature and rotated by suitable means about its central longitudinal axis. A forming mandrel B with a conical forming end 8 is forced axially into the heated end of the bar, with the result that the material of the bar will be displaced and caused to flow laterally from the center, whereby a conical recess C will be formed therein as shown in Fig. 2, the wall of which will flare outwardly to some extent. The forming mandrel is then withdrawn, and the wall of the cavity subjected to radial pressure by means of pressure devices D which act on the inner and outer surfaces of the wall and cause the metal of the same to flow axially while at the same time the faces of the wall are brought into parallelism and the wall given its final and desired size. The pressure devices are then removed from engagement with the wall and a cutter E is brought into operative relation to the recessed end of the bar and the extremity of the same severed therefrom, thereby forming the finished ring F.

These operations are repeated to form successive rings, the bar, after one recessed section has been removed, being subjected to the recessing and sizing operations described; whereby complete sized rings are formed successively from the end of the bar.

The drawings show one form of apparatus by way of example for carrying my improved method into effect, but it will be understood that other forms of apparatus may be employed, the invention as regards the method, not being dependent upon any particular form of apparatus by which it is carried into effect.

The said apparatus comprises a suitable frame or bed 1 in which is mounted a rotary chuck 2 adapted to hold the bar with the end to be acted on projecting therefrom and unconfined exteriorly, the spindle of the chuck having connected with it a driving gear 3 by which rotary motion is imparted thereto from any suitable source of power. Sustained by the frame are a series of pressure rollers 4, in the present instance four in number, which are disposed at equal intervals around the axis of the chuck, and are rotatable on axes parallel with said axis so that the outer surface of the wall of the recess in the rotating bar will travel in contact with said rollers. These rollers are mounted respectively on slides 5 movable in guiding slots radiating from the axis of rotation of the chuck, and are adjustable by suitable means in said guides to correspondingly adjust the rollers to and from the axis of rotation, these several rollers constituting in effect rolling abutments adjustable to size the external diameter of the recessed end of the bar and consequently the external diameter of the ring to be produced.

Mounted on the bed opposite the chuck is a horizontal longitudinally movable slide 6, and mounted on this slide and movable transversely relatively to the chuck is a carriage 7, which carriage sustains side by side a forming mandrel 8 adapted by the longitudinal movement of the slide to be forced into the end of the rotating bar to form the recess therein, and a rotary pressure device 9 adapted by the longitudinal movement of the slide to enter the recess formed by the mandrel and to coöperate with the pressure rollers 4 in subjecting the walls of said recess to radial pressure to size and shape the same. The rotary pressure device 9 is mounted in suitable bearings in the carriage and has fixed to it a driving gear 10 by which rotary motion is imparted thereto from any suitable source of power.

In the operation of this mechanism, the bar in heated condition is clamped in the chuck with the end to be operated on projecting therefrom, and the pressure rollers 4 are adjusted relatively to the axis in accordance with the diameter of the ring to be produced. The carriage 7 is then moved on the slide 6 transversely to a position where the mandrel 8 will be in alinement with the central axis of the bar, and rotary motion is imparted to the chuck to rotate the bar. By suitable feeding means the carriage 7 is advanced to force the mandrel centrally into the heated end of the rotating bar, the effect of which will be to displace the material of the bar laterally and form therein a conical recess with a flaring annular wall. The slide is then retracted to withdraw the mandrel from the recess, and the carriage is shifted transversely to bring the pressure device 9 opposite the said recess, the said pressure device being rotated by its gear 10. The pressure device is formed with a rounded end $9^a$ beyond which its sides are cylindrical and concentric with the axis of rotation. The slide is now advanced as before, thereby entering the rounded end of the pressure device into the recess in the bar, and as the carriage advances the cylindrical sides of the pressure device will be forcibly engaged with the interior wall of the recess, and will subject the same to radial pressure against the surrounding pressure rollers 4, which action will cause the material of the wall to flow forwardly between the pressure device and pressure rollers, and will bring the inner and outer faces of the wall into exact parallelism, while at the same time giving the wall its proper size and diameter as determined by the pressure rollers. When this operation is completed, the slide is retracted to withdraw the pressure device 9, and the severing cutter E, in the present instance in the form of a rotary saw, is engaged with the bar and the recessed end thereof severed, thereby forming the finished ring F.

The foregoing operations are repeated for the production of successive rings, which are severed in succession from the end of the bar between the recessing and sizing operations, it being understood that the bar is rechucked at proper intervals to present additional material to be acted on.

It will be observed that by the practice of my improved method, but a limited portion of the bar is acted on in the formation of the successive rings, which fact lends itself to the character of the metal employed in the manufacture of the bearing rings of antifriction bearings, for which purpose my invention is especially designed. The metal employed for this purpose is high grade alloy steel, which is not susceptible of extensive deformation or flow without danger of injurious effects tending to unfavorably influence its structure and produce defects therein. By subjecting the wall of the recess to radial rolling pressure between the pressure rollers and pressure device, the material is worked and kneaded in a uniform and gradual manner, and the molecules caused to be distributed in the manner best adapted for giving the highest degree of resisting and wearing qualities.

Having thus described my invention, what I claim is:

1. The method of forming rings from solid bars, which consists in rotating a bar, applying a forming mandrel axially to the end of the bar to displace the material thereof and form a recess therein, removing the mandrel from the recess, subjecting the wall of the recess to radial pressure to size the same, and severing a section of the recessed portion of the bar to form a ring.

2. The method of forming rings from solid bars, which consists in rotating a bar about its longitudinal axis with its end unconfined exteriorly, displacing the material of the center of the bar laterally to form a flaring recess therein, subjecting the wall of the recess to radial pressure to bring the same to the desired shape, and severing a section of the recessed portion of the bar to form a ring.

3. The method of forming rings from solid bars, which consists in rotating the bar about its longitudinal axis with its end exposed and unconfined exteriorly, forcing a forming mandrel axially into the end of the bar and thereby displacing the material of the same laterally and forming a flaring recess therein, subjecting the wall of the recess to radial pressure to bring the same to the desired shape, and severing a section of the recessed portion of the bar to form a ring.

4. The method of forming rings from solid bars, which consists in severing transverse sections successively from the end of the bar, and recessing the bar centrally between the severing operations by displacing the material of the bar laterally by a flowing action.

5. The method of forming rings from solid bars, which consists in rotating a bar about its longitudinal axis, severing transverse sections in succession from the end of the bar, and between the severing operations, displacing the material of the center of the bar to form cavities therein successively.

6. The method of forming rings from solid bars, which consists in rotating a bar about its longitudinal axis, severing transverse sections in succession from the end of the bar, and between the severing operations, recessing the end of the bar by displacing the material of the bar laterally by a flowing action and sizing the walls of the recesses successively.

In testimony whereof, I have affixed my signature in presence of a witness.

JOSEPH A. GANSTER.

Witness:
   Jno. Ennis, Jr.